Patented Nov. 22, 1938

2,137,344

UNITED STATES PATENT OFFICE 2,137,344

DIRECTIONAL INTAKE CONTROL FOR INTERNAL COMBUSTION ENGINES

John J. McCarthy, Malden, Mass.

Application April 8, 1936, Serial No. 73,225

3 Claims. (Cl. 123—65)

My present invention is directed to internal combustion engines, preferably of the type shown and described in my prior and copending application Ser. No. 615,376, filed June 4, 1932, now Patent No. 2,067,496, dated January 12, 1937.

An object of the present invention is to improve and perfect internal combustion engines of the type of my said prior invention and to provide positive means which will control the direction, extent, force, and effect of the tangential air delivery into the combustion cylinders.

As explained in my said prior patent, an important feature of my development of internal combustion engines, particularly of the Diesel type or semi-Diesel type, consists in my novel arrangement of directional flow of air current into the combustion cylinder or cylinders. I have discovered that by injecting air into the combustion chambers of an engine cylinder with a tangential line of current flow that a highly efficient result is produced.

This is particularly efficacious in a Diesel engine of the two cycle type wherein a rapid scavenging or cleaning effect is necessary to remove the exhaust gases and other products of the previous combustion or power stroke, as well as to supply the proper quantity of air or fuel for the succeeding combustion and power stroke. Also, I have discovered that this tangential air directional feature is of peculiar advantage in the Diesel type of engine whether two-cycle or four-cycle, by increasing the turbulence of the air in the combustion chamber to a higher degree, thereby increasing the power, speed, and efficiency of the engine.

My present invention is directed to the feature of controlling the direction, volume, and effect of the tangential air supply into the combustion chambers of internal combustion engines particularly of the Diesel type and, preferably, of the two-cycle type.

In carrying out my present invention I provide novel means which will determine the direction and quantity of the air supply injected into the combustion chamber of each cylinder, preferably by means of a valve or series of valves in each air intake opening. Preferably, also, I arrange automatic controlling means so that the directional air flow can be regulated proportionately to the speed and load of the engine for most efficient results.

My present invention can be utilized either with a duplex type of engine having double opposed pistons operating in a cylinder with the expansive charge working between the pistons, or it may be equally advantageously utilized in a single piston cylinder, multiple cylinder, sleeve valve construction, or any internal combustion engine. Furthermore, my directional air controlling mechanism and method may be employed to direct the fuel in a spark-exploded internal combustion engine, as well as in one of the Diesel type. This is particularly valuable in installations where a supercharging arrangement is provided in combination with the internal combustion cylinders.

In carrying out my invention I provide movable vanes or baffles somewhat similar to a butterfly type of valve arranged in the intake port or ports in the engine cylinder and provide means, preferably automatic, although manually operated, if desired, which will move each vane in its port to increase, decrease, and control the direction of the air, gas, or fuel flowing into the combustion chamber of the cylinder. Also, I provide means for adjusting the vanes to attain any desired volume in the intake as well as current directional flow to thereby control the turbulence within the combustion chamber. Furthermore, I provide means to vary these effects during the continuous operation of the engine directly proportional to the speed or the load, or both, so as to attain the most efficient result.

As above noted, I may utilize my present invention in a wide variety and types of internal combustion engines whether of the Diesel type, semi-Diesel, or spark-explosive gasoline type, and either with or without a supercharger, and either in a double-opposed cylinder type of engine of my prior patent, or in the conventional type of single piston and cylinder engine and, of course, in a unit with any plurality of cylinders and arrangement, viz., in-line, V-type, radially positioned, or other combinations of cylinders, as well as in the sleeve valve type utilized in the attached drawings for illustrative purposes.

Referring to the drawings illustrating one form of my invention and as applied to a single cylinder engine, for illustrative purposes only, and of an improved type illustrated in my said prior patent, wherein a piston reciprocates in a sleeve which also controls the intake and exhaust ports for the combustion chamber, I have illustrated a preferred type of my present invention with automatic controlling means wherein, Fig. 1 is a longitudinal cross-sectional view of such an engine and cylinder embodying a preferred form of the invention;

Figure 1:
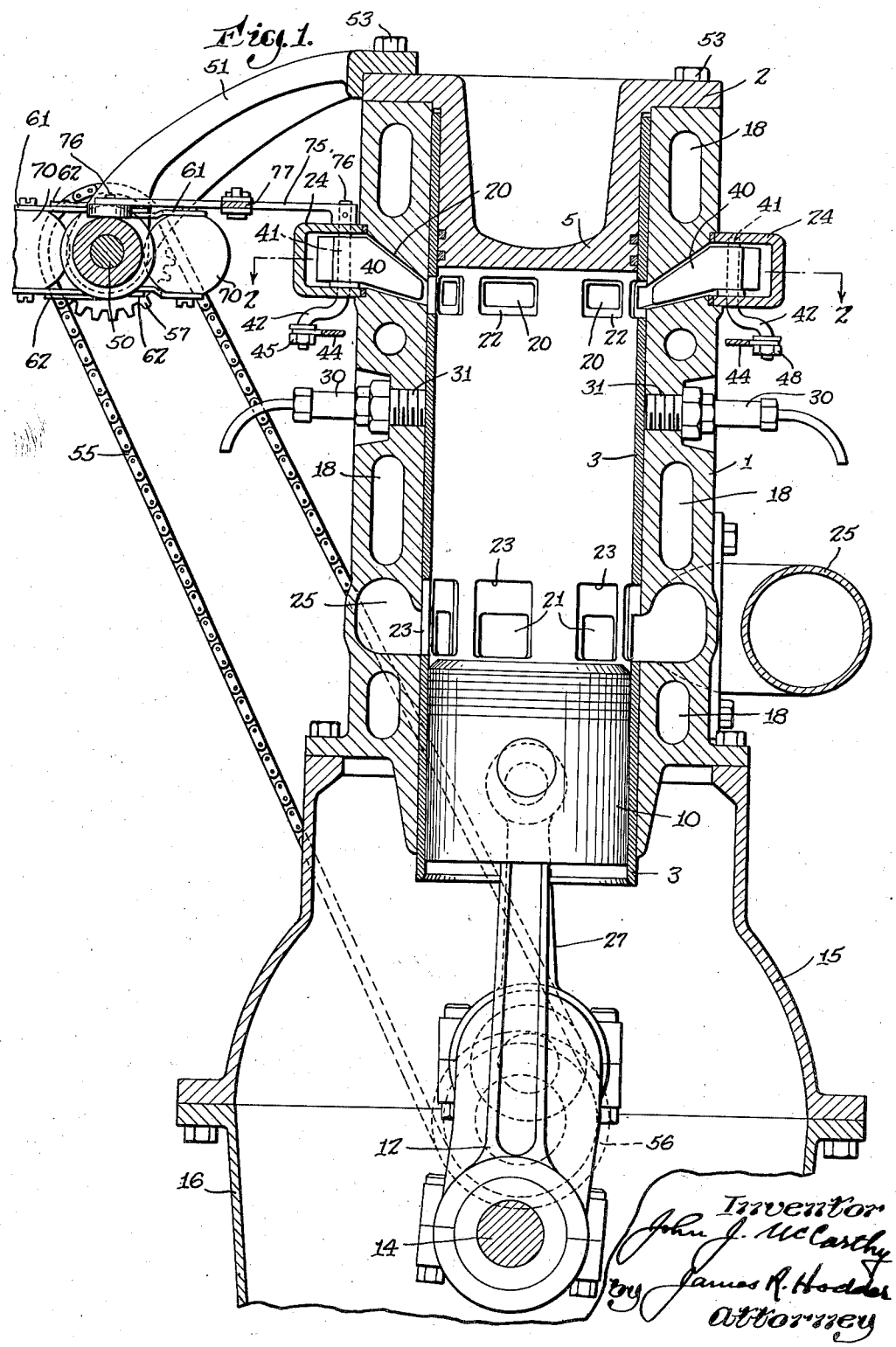

Referring to the drawings utilizing my novel type of engine, 1 indicates a suitable cylinder casting having a removable head 2 bolted thereon, and in the interior of the cylinder is a sliding sleeve 3 having secured at the upper end a head 5; and arranged to reciprocate in the interior of the sleeve 3 is a piston 10 to which the usual crank shaft 12 is attached to a crank 14 on the driving shaft.

Supporting the casting 1 is a base 15 bolted to a bottom supporting and enclosing casting 16. In the cylinder casting 1 I may arrange the usual cored channels 18, 18, 18 for water circulation and for cooling, and a series of tangentially positioned intake ports 20 and outlet or exhaust ports 21. These ports are proportionately spaced for the stroke of the piston 10 and are arranged peripherally around the casting 1, the intake ports 20 opening from a manifold 24 and the exhaust ports 21 opening into a manifold 25, each manifold being arranged around the casting to communicate with all its respective ports.

In the sleeve 3 are corresponding ports 22 adapted to register with the intake ports 20 when the sleeve is at one position and with openings 23 to register with the exhaust ports 21. The sleeve 3 is operated by a connecting rod 27 secured to a crank shaft of the engine and operated in synchronism with the piston 10, also connected on the same crank shaft, this being explained in my said copending application, but any other method of operations may be utilized.

In the engine here illustrated I have shown the Diesel type which is provided with fuel injectors 31 threaded thru tapped recesses 31 in the walls of the casting 1, and positioned to inject the fuel at the proper time of compression operating thru the ports 20, which will be in line to register with the injectors 30 at the moment of or just in advance of the greatest compression between the top of the piston 10 and the bottom of the head 5, as viewed in Fig. 1.

The ports 20 are formed thru the casting 1 in a slanting or inclined manner tangentially with the circular walls of the casting 1 and sleeve 3 and, hence, tangentially relatively with the cylinder and the compression chamber contained therein.

Figure 2:
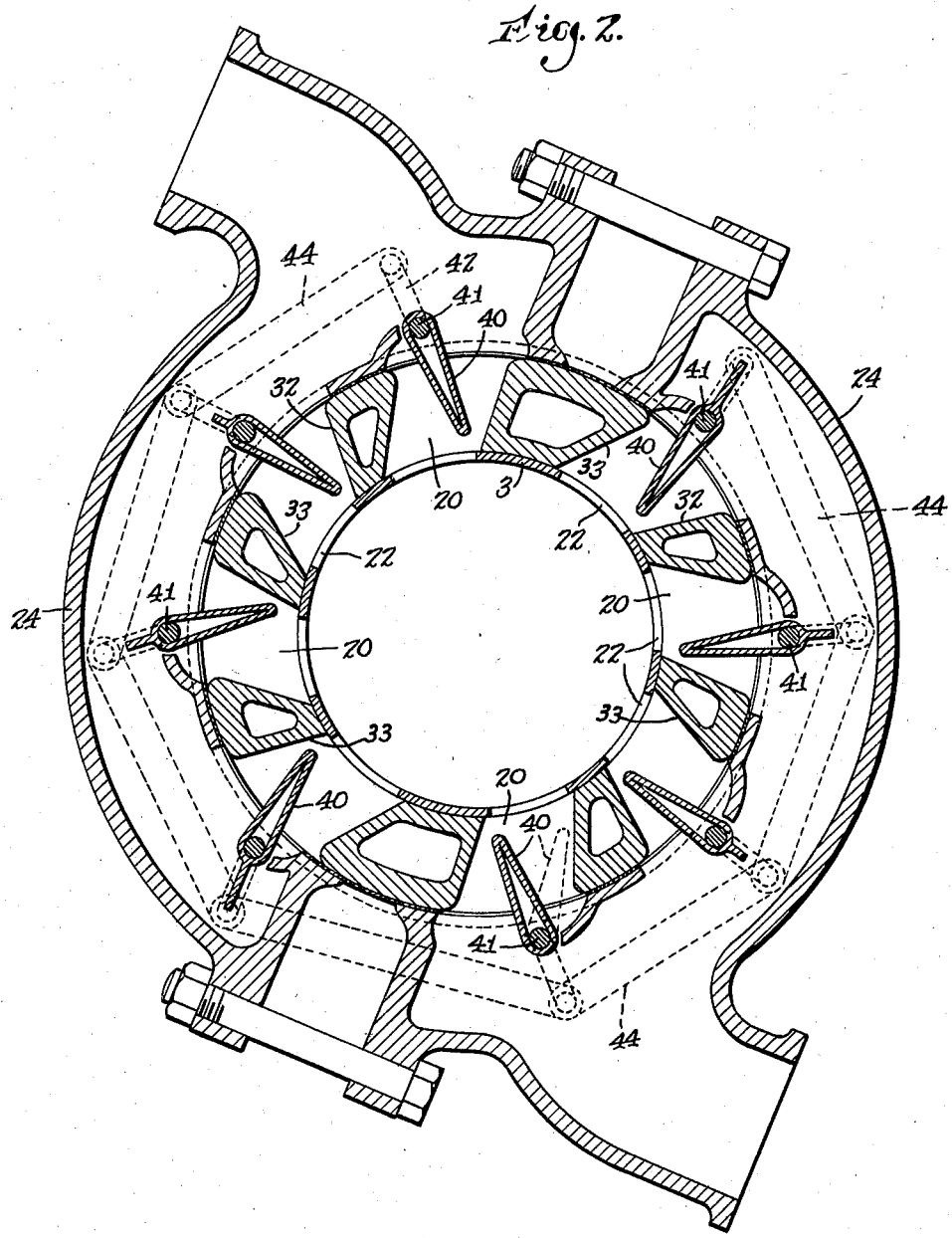
Fig. 2 is an enlarged cross-sectional view on the line 2—2 of Fig. 1.

As shown in Fig. 2 I form the vertical sides of each port 20, as indicated at 33 and 32, directing the flow thru said port 20 and thru the corresponding openings 22 in the sleeve 3 when the same are in register in a pronounced tangential direction, this being futher explained and claimed broadly in my said Patent No. 2,067,496.

In my present devices for controlling the frictional flow thru the ports 20 and hence for increasing or decreasing the tangential effect and simultaneously controlling the volume admitted thru the intake ports, as well also as increasing and decreasing and, therefore, controlling the speed and velocity thru the intake ports will now be described.

While any suitable controlling means may be employed that herein illustrated consists of a simple set of vanes 40 extending partly into each port 20, and of corresponding contour so as to afford a relatively close fit for said ports 20, particularly where such ports are formed with a nozzle effect, as shown in Fig. 1 to increase the injection delivery thru the same, the vanes 40 being of corresponding contour and each mounted on a shaft 41 extending thru bearings in the manifold 24 at appropriate positions in front of each port 20.

Each vane 40 may be adjustably secured to its supporting and operating shaft 41 or may be keyed thereto, an adjustment being desirable for determining efficiency of the variable directional current flow during tuning up of the engine but thereafter being fixed permanently on the shaft 41. Each shaft 41 extends thru the manifold 24 and may be shaped into a crank-like portion 42 to which a link 44 is secured by a bolt 45 or in any other suitable manner.

These links 45 may conveniently extend from one shaft 41 to another and be operated in unison, either manually or automatically—preferably by the latter form—and so that all the vanes 40 will be moved in unison when increasing, decreasing, or otherwise controlling the supply thru the ports 20.

For this purpose I secure at a convenient position and at a suitable point adjacent the engine cylinder a governor operable on the centrifugal principle, or otherwise, in association with the speed of the engine or the load imposed on it, and provide suitable connections from such governor to the links 44, moving the shafts 41, and hence operating the vanes 40 in each port. A convenient method of carrying out this arrangement is to provide a pair of brackets 51 and 52 suitably attached to the cylinder head by bolts 53—53, said brackets having bearings in their outer ends for a shaft 50, which shaft is rotated by a sprocket chain 55 led around a sprocket wheel 56 on the drive shaft, and a corresponding sprocket wheel 57 keyed to the shaft 50, the sprocket walls being in suitable proportion either increasing or decreasing the driving speed on the governor, as may be desired.

Slidably mounted on the shaft 50 is a sliding collar 60 with a link 61 pivoted thereto and a cooperating link 62 pivoted at 63 to the link 61, and with its opposite end pivotally secured at 64 to a hub 65 secured at 66 to the shaft 50. An appropriate weight 70 is attached to the extreme end of the link 61 and an expansible coiled spring 71 bearing between the hub 65 and the sliding collar 60 will operate as a usual type of centrifugal governor, the speed of rotation of the shaft 50 acting on the weight 70, which in turn operates the linkage connection 61 and 62 to raise the sliding collar 60 and compress the spring 71 proportionately to the speed and centrifugal force of the weight 70. Any suitable operating connection between the governor and the vanes 40 may be utilized, that herein shown consisting in a link 75 pivotally secured at 76 to a part of the sliding collar 60, and with its opposite end rigidly attached at 74 to one of the crank portions 42 of the vane operating shafts, as clearly illustrated in Fig. 3.

Figure 3:
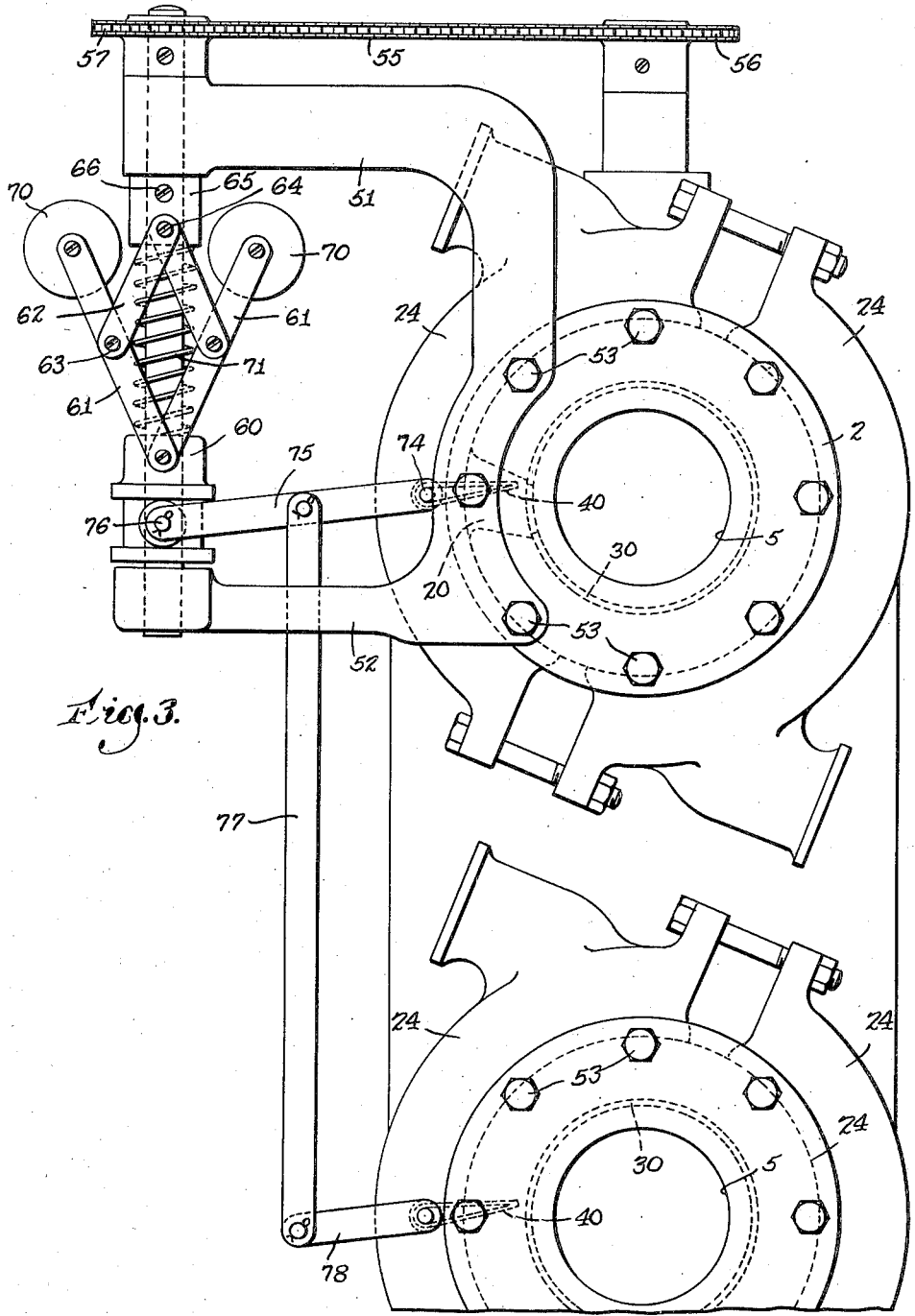
Fig. 3 is a diagrammatic view showing an automatic controlling means to operate the current directional flow during the continuous operation of the engine proportional to speed and load desired.

A plurality of cylinders may be similarly controlled by attaching a connecting rod 77 from the link 75 to a corresponding lever 78 at an adjacent engine cylinder, as indicated in Fig. 3. After the vanes 40 may have been adjusted on their respective supporting and operating shafts 41, and the engine is started, the tangential flow thru the intake ports is thus automatically controlled, together with volume, speed, and turbulence within the compression chamber of the cylinder by the automatic variation of the vanes 40 as oscillated between the walls 31 and 32 of each port 20 thru the actuation of the governor mechanism as described.

It will thus be seen that I have devised a novel, improved and efficient intake port controlling mechanism particularly for directional control in a tangential action, as well as capacity, volume, and speed of intake, into the combustion cylinder of an internal combustion engine whether such engine is of the Diesel, semi-Diesel, or gasoline explosive type.

Thus by controlling the tangential effect thru the intakes and, hence, increasing the efficiency of the scavenging action, particularly in such engines of the two-cycle type, and greatly increasing the turbulence and hence mixture within the combustion chamber in either two-cycle or four-cycle operations, I have greatly improved the combustion, efficiency, the economy, and the operation of such types of engines; and I wish to claim the same herein broadly.

I claim:

1. In an internal combustion engine of the compression ignition type, having tangentially arranged intake ports each provided with a movable vane formed to direct air into the combustion chamber with a tangential flow, in combination with means to increase the turbulence of mixture within the engine cylinder by controlling the delivery angle of the intake ports by the movement of said vanes.

2. In an internal combustion engine of the compression ignition type, having tangentially arranged intake ports formed with a plurality of adjustable direction controlling vanes to direct air into the combustion chamber with a tangential flow, in combination with means to increase the turbulence of mixture within the engine cylinder by controlling the intake ports in capacity and direction of flow therethrough by the adjustment of said vanes.

3. In an internal combustion engine of the compression ignition type, having tangentially arranged intake ports formed with a plurality of adjustable direction controlling vanes to direct air into the combustion chamber with a tangential flow, in combination with means to automatically increase the turbulence of mixture within the engine cylinder by controlling the operative position of the intake ports in capacity and direction of flow therethrough during the continuous operation of the engine.

JOHN J. McCARTHY.